United States Patent Office 2,789,101
Patented Apr. 16, 1957

2,789,101
VINYL CHLORIDE COMPOSITIONS

Joseph E. Wilson, New Brunswick, N. J., assignor to Union Carbide and Carbon Corporation, a corporation of New York No Drawing. Application February 24, 1953,
Serial No. 338,617

12 Claims. (Cl. 260—31.8)

Those artificial resins known collectively as vinyl resins have attained wide recognition in the field of plastics. Of this class, the resins which are obtained by the polymerization of a vinyl halide, usually vinyl chloride, are probably the most widely known, particularly those resins such as are formed by the conjoint polymerization of vinyl chloride with vinyl esters of aliphatic acids or with unsaturated polymerizable compounds.

It is well known that these resins tend to decompose when heated to the extent required in their formation and fabrication into various products. Generally this decomposition is accompanied by discoloration or embrittlement or both and is attributed in part to the liberation of hydrogen chloride from the polymer. It is also attributed in part to oxidation of the polymer, high processing temperatures, and the instability of normally employed resin modifiers such as plasticizers, lubricants, and dyes.

To overcome decomposition resulting from the liberation of hydrogen chloride, it has long been the practice to add compounding substances, generally known as stabilizers or acceptors to the polymers. These substances either neutralize the acid or they combine readily with hydrogen chloride to form relatively inert compounds. They generally do not, however, overcome decomposition resulting from other causes referred to above, and for this reason there is usually some residual color in polymers containing vinyl chloride so stabilized.

Accordingly, it is an object of this invention to provide new vinyl chloride resin compositions which are not subject to decomposition and the resulting discoloration or embrittlement or both.

It has been found that vinyl chloride resin compositions, already stabilized against decomposition resulting from the liberation of hydrogen chloride, may be further stabilized against such decomposition and also stabilized against decomposition resulting from other causes by the addition of small amounts of ethyl ortho-formate. While neither stabilizer is sufficient as of itself to fully prevent decomposition of vinyl chloride resin compositions, they do, when employed together, produce a synergistic stabilizing effect.

Those resins which may be stabilized in accordance with the present invention include the chlorine containing vinyl resins such as the polymers of vinyl chloride; conjoint polymers of vinyl chloride with vinyl esters of aliphatic acids, with esters of acrylic and methacrylic acids, and with acrylonitrile; after-chlorinated vinyl polymers; and the chlorine-containing vinylidene resins such as polymers of vinylidene chloride and conjoint polymers of vinylidene chloride with vinyl chloride; and other polymerizable compositions. The conjoint polymers which may be stabilized according to the invention are those containing at least 10 percent by weight of vinyl chloride. Of particular importance are those conjoint polymers containing from 70 percent to 98 percent by weight of vinyl chloride and from 2 percent to 30 percent by weight of another polymerizable compound.

The stabilizers may be incorporated in the resin by any of the well known methods so long as a uniform distribution is obtained. In instances where the composition is to be employed in molding, extruding or calendering operations, the stabilizers may be admixed with the vinyl resin on a two-roll mill or in a Banbury mixer. Generally the stabilizers together with other normally employed modifiers, such as plasticizers, lubricants, and pigments, are incorporated in a single operation. The amount of ethyl ortho-formate added varies from about 0.5 percent to about 10 percent by weight of the resin.

The following examples more fully disclose my invention.

EXAMPLE I

Polyvinyl chloride resin powder was blended with two plasticizers, di(2-ethylhexyl)phthalate and di(2-ethylhexyl)adipate, a stabilizer to prevent decomposition resulting from the liberation of hydrogen chloride, dibutyl tin dilaurate, in the proportions listed below for composition 1A. Another composition, 1B, was blended from the identical ingredients and contained in addition 1 percent by weight of the vinyl chloride resin of ethyl ortho-formate. The two compositions were milled on a 12-inch mill to form sheets of 0.040 inch thickness.

*Formulations*

|  | Composition 1A (parts) | Composition 1B (parts) |
|---|---|---|
| Polyvinyl chloride | 100 | 100 |
| Di(2-ethylhexyl)phthalate | 23 | 23 |
| Di(2-ethylhexyl)adipate | 23 | 23 |
| Dibutyl tin dilaurate | 2 | 2 |
| Ethyl ortho-formate | | 1 |

Samples of the prepared sheets were then subjected to a heat-aging test conducted at 158° C. in an air oven. At one-half hour periods, the samples were withdrawn from the oven and the reflectance of blue light measured, since differences in such reflectance provide a reliable index of the amount of discoloration. To measure the reflectance, a photometer was employed and adjusted to read 100 percent reflectance from a white block of magnesium oxide.

*Air Oven Aging, 158° C.*

|  | Percent Blue Light Reflectance After— ||||||| 
|---|---|---|---|---|---|---|---|
|  | 0.0 Hr. | 0.5 Hr. | 1.0 Hr. | 1.5 Hr. | 2.0 Hr. | 2.5 Hr. | 3.0 Hr. |
| 1A | 84 | 79 | 76 | 75 | 45 | 20 | 9 |
| 1B | 89 | 86 | 85 | 81 | 69 | 68 | 27 |

The above comparison of blue light reflectance clearly indicates that after 2.5 hours of heating sample 1B, containing ethyl ortho-formate in addition to a hydrogen chloride acceptor, was markedly superior to sample 1A in terms of appearance and in terms of reflectance.

EXAMPLE II

To illustrate the stabilizing effect of our stabilizers on opaque vinyl-chloride-containing compositions, samples were prepared containing titanium dioxide. In this instance, polyvinyl chloride resin was blended with a plasticizer, di(2-ethylhexyl)phthalate; a stabilizer to prevent decomposition resulting from the liberation of hydrogen chloride, lead phosphite; a lubricant, stearic acid; and coloring material, titanium dioxide; in proportions listed below for composition 2A. Another composition, 2B, was blended from the identical ingredients and contained, in addition, 7.5 percent by weight of ethyl ortho-formate, which was introduced in place of a portion of the parts of the plasticizer.

*Formulations*

|  | Composition 2A (parts) | Composition 2B (parts) |
|---|---|---|
| Polyvinyl chloride | 100.0 | 100.0 |
| Di(2-ethylhexyl)phthalate | 40.0 | 32.5 |
| Lead phosphite | 2.0 | 2.0 |
| Stearic acid | 0.5 | 0.5 |
| Titanium dioxide | 1.0 | 1.0 |
| Ethyl ortho-formate | | 7.5 |

Samples of prepared sheets were then subjected to a heat-aging test conducted at 158° C. in an air oven. At one-half hour periods, the samples were withdrawn from the oven and the reflectance of blue light measured, since differences in such reflectance provide a reliable index of the amount of discoloration. To measure the reflectance, a photometer was employed and adjusted to read 100 percent reflectance from a block of magnesium oxide.

*Air Oven Aging Test, 158° C.*

| | Percent Blue Light Reflectance After— | | | | | |
|---|---|---|---|---|---|---|
| | 0.0 Hr. | 1.0 Hr. | 2.0 Hr. | 3.0 Hr. | 4.0 Hr. | 5.0 Hr. |
| 2A | 92 | 92 | 82 | 64 | 39 | 28 |
| 2B | 93 | 88 | 87 | 81 | 64 | 41 |

Sample 2B, containing ethyl ortho-formate and a hydrogen chloride stabilizer, after five hours of heating reflected a much greater quantity of blue light than sample 2A.

An additional advantage of my invention is that the prepared samples did not either before or after heating possess a trace of an objectionable odor. This feature is of particular importance, as there have been reported in the industry numerous instances wherein the use of polyvinyl chloride compositions is limited because of objectionable odors apparently caused by the heretofore employed stabilizers.

The stabilizers, which prevent decomposition of vinyl chloride polymers resulting from the liberation of hydrogen chloride, and which may be employed with ethyl ortho-formate to more fully stabilize such polymers or compositions thereof, include those that are conventionally employed in the art. Thus I may employ the organo-tin compounds, such as dibutyl tin dilaurate and dibutyl tin maleate; lead compounds, such as lead carbonate, tribasic lead sulfate, litharge, lead silicylate, lead maleate, dibasic lead phosphate, dibasic lead phthalate; alkali and alkaline metal salts, such as sodium carbonate, trimagnesium phosphate and calcium stearate; and epoxy compounds, such as glycidyl oleate, the diglycidyl ethers of diphenols and glycidyl oleate. The particular stabilizer employed for the purpose forms no part of my invention as of itself. Such stabilizers do, however, constitute a part of my invention when they are employed with ethyl ortho-formate to fully stabilize vinyl chloride resins or compositions against decomposition.

My invention is not to be restricted to the stabilization of those vinyl chloride compositions containing the particular modifiers disclosed in the above examples, but is instead to include such compositions containing any of the well known plasticizers, lubricants, and coloring matter employed in the art. Commonly employed plasticizers include the monomeric or polymeric esters of mono- and difunctional acids and alcohols; esters of mono- and difunctional acids and ether alcohols, such as di(butoxyethyl)phthalate; epoxy compounds, such as glycidyl oleate and epoxidized soy bean oil; esters of alcohols and phosphoric acid, such as tri(2-ethylhexyl) phosphate and diphenyl mono-octyl phosphate.

I claim as my invention:

1. A composition of matter comprising a polyvinyl chloride resin, a plasticizer for said resin, dibutyl tin dilaurate and from 0.5 to 10 percent by weight of the resin of ethyl ortho-formate.

2. A composition of matter comprising a polyvinyl chloride resin, a plasticizer for said resin, lead phosphite and from 0.5 to 10 percent by weight of the resin of ethyl ortho-formate.

3. A composition of matter comprising a polyvinyl chloride resin, di(2-ethylhexyl)phthalate, dibutyl tin dilaurate, and from 0.5 to 10 percent by weight of the resin of ethyl ortho-formate.

4. A composition of matter comprising a polyvinyl chloride resin, di(2-ethylhexyl)phthalate, lead phosphite and from 0.5 to 10 percent by weight of the resin of ethyl ortho-formate.

5. A composition of matter comprising a chlorine-containing polyvinyl resin which tends to liberate hydrogen chloride and decompose when subjected to elevated temperatures and two different stabilizers, one of said stabilizers consisting of a basic reacting compound capable of reacting with hydrogen chloride and the other of said stabilizers consisting of ethyl ortho-formate, said ethyl ortho-formate being present in said composition in an amount of from 0.5 to about 10 percent by weight of said chlorine-containing vinyl resin.

6. A composition of matter comprising a polyvinyl chloride resin which tends to liberate hydrogen chloride and decompose when subjected to elevated temperatures and two different stabilizers, one of said stabilizers consisting of a basic reacting compound capable of reacting with hydrogen chloride and the other of said stabilizers consisting of ethyl ortho-formate, said ethyl ortho-formate being present in said composition in an amount of from 0.5 to about 10 percent by weight of said polyvinyl chloride resin.

7. A composition of matter comprising a chlorine-containing polyvinyl resin which tends to liberated hydrogen chloride and decompose when subjected to elevated temperatures and two different stabilizers, one of said stabilizers consisting of dibutyl tin dilaurate and the other of said stabilizers consisting of ethyl ortho-formate, said ethyl ortho-formate being present in said composition in an amount of from 0.5 to about 10 percent by weight of said chlorine-containing vinyl resin.

8. A composition of matter comprising a chlorine-containing polyvinyl resin which tends to liberate hydrogen chloride and decompose when subjected to elevated temperatures and two different stabilizers, one of said stabilizers consisting of lead phosphite and the other of said stabilizers consisting of ethyl ortho-formate, said ethyl ortho-formate being present in said composition in an amount of from 0.5 to about 10 percent by weight of said chlorine-containing vinyl resin.

9. A composition of matter comprising a chlorine-containing polyvinyl resin which tends to liberate hydrogen chloride and decompose when subjected to elevated temperature, a plasticizer for said resin and two different stabilizers, one of said stabilizers consisting of a basic reacting compound capable of reacting with hydrogen chloride and the other of said stabilizers consisting of ethyl ortho-formate, said ethyl ortho-formate being present in said composition in an amount of from 0.5 to about 10 percent by weight of said chlorine-containing vinyl resin.

10. A composition of matter comprising a polyvinyl chloride resin which tends to liberate hydrogen chloride and decompose when subjected to elevated temperatures, a plasticizer for said resin and two different stabilizers, one of said stabilizers consisting of a basic reacting compound capable of reacting with hydrogen chloride and the other of said stabilizers consisting of ethyl ortho-formate, said ethyl ortho-formate being present in said composition in an amount of from 0.5 to about 10 percent by weight of said polyvinyl chloride resin.

11. A composition of matter comprising a vinyl-chloride-vinylidene-chloride copolymer resin which tends to liberate hydrogen chloride and decompose when subjected to elevated temperatures and two different stabilizers, one of said stabilizers consisting of a basic reacting compound capable of reacting with hydrogen chloride and the other of said stabilizers consisting of ethyl ortho-formate, said ethyl ortho-formate being present in said composition in an amount of from 0.5 to about 10 percent by weight of said vinyl-chloride-vinylidene-chloride copolymer resin.

12. A composition of matter comprising a chlorine-containing resin, which tends to liberate hydrogen chloride and decompose when subjected to elevated temperatures, taken from the class consisting of chlorine-containing vinyl resins and polyvinylidene chloride resin and two different stabilizers, one of said stabilizers consisting of a basic reacting compound capable of reacting with hydrogen chloride and the other of said stabilizers consisting of ethyl ortho-formate, said ethyl ortho-formate being present in said composition in an amount of from 0.5 to about 10 percent by weight of said chlorine-containing resin.

References Cited in the file of this patent

UNITED STATES PATENTS 2,129,449   Talbot et al. _____ Sept. 6, 1938

OTHER REFERENCES

Page 117, Principles of High Polymer Theory and Practice, Schmidt and Marlies, pub. 1948, McGraw-Hill Book Co., New York.